Patented Oct. 3, 1944

2,359,673

UNITED STATES PATENT OFFICE 2,359,673

ACYLAMINES OF THE ANTHRAQUINONE SERIES AND A PROCESS FOR THEIR MANUFACTURE

Albin Peter, Basel, Switzerland, assignor to Sandoz A. G., Fribourg, Switzerland, a Swiss firm No Drawing. Original application January 16, 1942, Serial No. 427,076. Divided and this application November 9, 1943, Serial No. 509,620. In Switzerland November 6, 1940

16 Claims. (Cl. 260—278)

The present invention relates to new acylamines of the anthraquinone series, which are valuable vat dyestuffs dyeing natural and artificial cellulosic fibres in red to violet shades and to a process for the manufacture of the new acylamines.

It has been found that new acylamines of the anthraquinone series can be obtained by condensing an anthrapyridone compound of the general formula

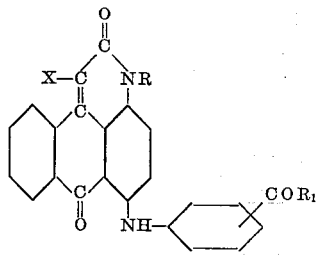

wherein R stands for a member of the group consisting of hydrogen and alkyl, $R_1$ stands for a member of the group consisting of hydroxy and halogen and X stands for a member of the group consisting of hydrogen, acyl, cyano and carbalkoxy, with a vattable anthraquinone compound containing at least one primary amino group.

The 4-(carboxy)phenylamino-1(N)9-anthrapyridone compounds which are to be used can be derived from N-methyl-1(N)9-anthrapyridone, C-carbethoxy-, C-carbomethoxy-, C-benzoyl-, C-acetyl-, C-cyano-anthrapyridone and the like. They can be obtained in known manner, for example by condensation of halogen-anthrapyridones with amino benzoic acids, by condensation of aminoanthrapyridones with halogen benzoic acids, by condensation of 1-amino-4-(carboxyphenyl)-amino-anthraquinones with malonic esters, aceto-acetic ester, cyano-acetic ester, benzoyl-acetic ester thus forming the corresponding anthrapyridones. For the preparation of the new acylamines the following carboxyl derivatives may, for instance, be used: N-methyl-4-carboxyphenylamino-1(N)9-anthrapyridones, C-carbomethoxy- and C-carbethoxy-4-carboxyphenyl-amino-1(N)9-anthrapyridones, C-acetyl-, C-benzoyl-, C-cyano-4-carboxyphenylamino-1(N)9-anthrapyridones and C-carbomethoxy- and C-carbethoxy-2-methyl-4-carboxyphenyl-amino-1(N)9-anthrapyridones and the like.

On the other hand, the following vattable amino-anthraquinones containing at least one primary amino group are suitable according to the present invention. Amino-anthraquinones, such as 1- and 2-aminoanthraquinone, 1-amino-3-bromoanthraquinone, 1-amino-5-, -6-, -7- and -8-chloroanthraquinone, 1-amino-6:7-dichloro-anthraquinone, 1-amino-4-methoxyanthraquinone, 1:4-, 1:5-, 1:8- and 2:6-diaminoanthraquinone, 1-amino-4-, -5- and -8-benzoylamino-anthraquinones, 1-amino-4-phenylaminoanthraquinone, 1-amino-4-(2'-chlorophenyl)-, -(3'-chlorophenyl)-, -(4'-chlorophenyl)aminoanthraquinone, 1-amino-4-(4'-methylphenyl)-, -(4'-methoxyphenyl)-aminoanthraquinone, 1-amino-4-phenylamino-6- or -7-chloroanthraquinone and the derivatives substituted in the phenyl nucleus by halogen, alkyl or alkoxy; moreover, aminoanthrapyridones, such as 4-amino-N-methyl-1(N)9-anthrapyridone, 4-amino-N-methyl-C-acetyl- and -C-carbethoxyanthrapyridone, 4-amino-2-methyl-C-carbethoxy-, -C-carbomethoxy-, -C-benzoyl-, -C-acetyl-, -C-cyanoanthrapyridone, 5-amino-C-carbethoxy-1(N)9-anthrapyridone, come into question, but also amino-anthrapyrimidines, such as 4-amino-1:9-anthrapyrimidine, 5-amino-1:9-anthrapyrimidine and finally aminoanthraquinone acridones, such as 4-aminoanthraquinone-2:1-(N)-benzacridone.

The condensation to the new acylamines takes place by heating the carboxyl compounds in a solvent, such as chlorobenzene, o-dichlorobenzene, nitrobenzene or the like, with phorphorus trichloride, phosphorus pentachloride, thionyl chloride and so on, whereby they are converted into the corresponding acid chloride and, if desired, after separation of the acid chloride and again taking it up in fresh solvent, by further heating the same with the amino compound with or without binding the liberated hydrochloric acid by means of basic substances, such as pyridine, di-methylaniline, alkali-acetate and the like.

The condensation can, however, also be carried out by heating the mixture of the carboxyl compound with the amino compound in a solvent, such as chlorobenzene, o-dichloro-benzene, nitrobenzene and so on, in the presence or absence of an acid binding agent, such as pyridine, dimethylaniline, alkali-acetate and the like, and with the addition of a condensing agent like phosphorus trichloride, phosphorus pentachloride, thionyl chloride and so on. Thionyl chloride is preferred on account of simplicity in use.

The temperatures required for the condensation vary within wide limits for example from 80° C. to 200° C. The heating is continued until test samples in alcohol show no further diminution of the alcohol-soluble starting materials. When the condensation has completed, the new acylamines are filtered off directly or after dilution with alcohol and purified, if necessary, by boiling with alcohol, glacial acetic acid, o-dichlorobenzene, nitrobenzene, aniline or with a dilute sodium carbonate solution to which sodium hypochlorite may be added, if desired.

The new acylamines may be used as vat dyes and as starting materials for other dyestuffs.

The following examples, without being limitative, illustrate the present invention. The parts are by weight.

Example 1

7.9 parts of N-methyl-4-(3'-carboxy)-phenylamino-1(N)9-anthrapyridone are heated to 140° C. with 6.9 parts of 1-amino-4-benzoylaminoanthraquinone and 200 parts of 1:2-dichlorobenzene and the mass is completely freed from water by conducting over it a current of dry air during 2 hours. Thereupon 3 parts of thionyl chloride are added under stirring and the temperature is maintained at 150° C. during 6 hours, then at 180° C. for further 6 hours. After cooling down to 100° C. 100 parts of alcohol are added; the dyestuff is filtered by suction, washed with alcohol and water and finally dried.

The so-obtained dyestuff having the formula

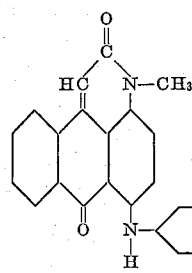

dyes natural and regenerated cellulose from a dark-red vat in a blue-red shade.

Example 2

7.9 parts of N-methyl-4-(4'-carboxy)-phenylamino-1(N)9-anthrapyridone are heated in 200 parts of 1:2-dichlorobenzene to 140° C. and the mixture is freed from water in the manner indicated in Example 1. Then 2.3 parts of thionyl chloride are added at 100° C. to this mixture and the mass stirred at this temperature during 6 hours. 4.5 parts of 2-aminoanthraquinone are now introduced thereinto and the whole stirred during 20 hours at 130° C. After having reduced the temperature to 90° C. 100 parts of alcohol are added and the dyestuff separated by filtration. It is washed and dried in the usual manner.

The new dyestuff possesses the formula

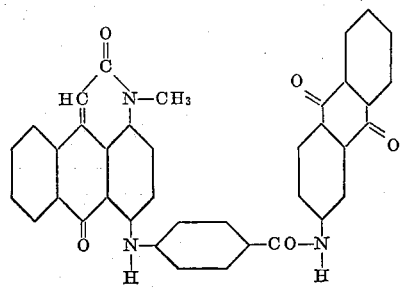

It dyes cotton from a red-orange vat in a bluish-red shade.

Example 3

To a mixture of 8.7 parts of N-methyl-4-(4'-carboxy)-phenylamino-1(N)9-anthrapyridone with 200 parts of trichlorobenzene and 2.6 parts of thionyl chloride, which has been stirred for 5 hours at 100° C., 2.5 parts of pyridine and 2.4 parts of 1:4-diaminoanthraquinone are added and the temperature maintained at 180° C. during 9 hours. The dyestuff thus produced is isolated in the usual manner. It dyes cotton from a dark-red vat in blue-red shades and possesses the formula

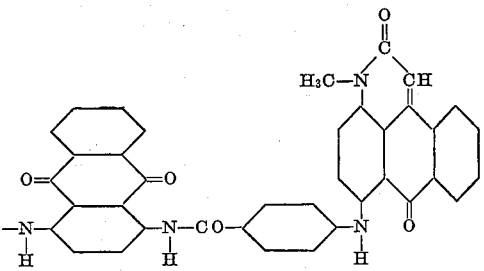

Example 4

10 parts of C-carbethoxy-4-(4'-carboxy)-phenylamino-1(N)9-anthrapyridone are stirred for 10 hours with 20 parts of thionyl chloride and 60 parts of chlorobenzene at 75° C. After cooling down the obtained acid chloride is separated and dried in vacuo at 70° C.

9.9 parts of this product are introduced at 100° C. into a mixture of 6.9 parts of 1-amino-4-benzoylaminoanthraquinone, 200 parts of nitrobenzene and 2.5 parts of pyridine and the whole is stirred for 18 hours at 100° C. After dilution with alcohol the dyestuff is separated, washed and dried. It forms with hydrosulphite a dark-red vat, dyeing cotton in a blue-red shade.

It possesses the formula:

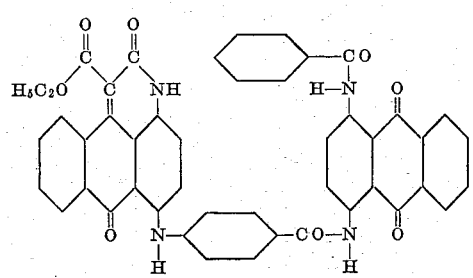

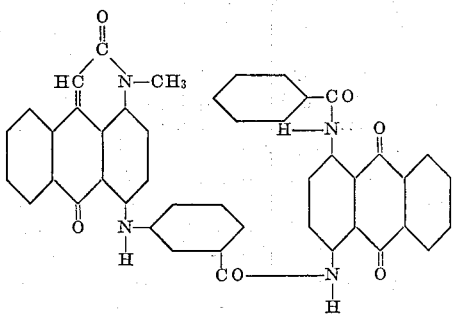

EXAMPLE 5

2.4 parts of 1:5-diaminoanthraquinone, 200 parts of trichlorobenzene and 9.9 parts of the chloride of the C-carbethoxy-4-(4'-carboxy)-phenylamino-1(N)9-anthrapyridone (prepared according to Example 4) are stirred for 18 hours at 140° C. After cooling down to 100° C. the mass is diluted with 100 parts of alcohol. added thereto under stirring; stirring is continued for a further hour at 150° C. Then 8.9 parts of 5-amino-1:1'-dianthrimide are added and stirred for further 6 hours at 180° C. The new dye is obtained by dilution with alcohol and filtration. It dyes cellulose threads bordeaux red from a red-brown vat.

It possesses the formula

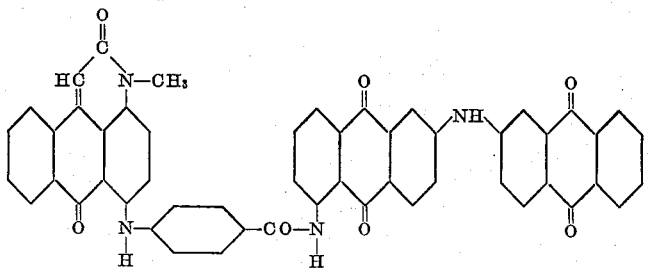

The separated dyestuff having the formula

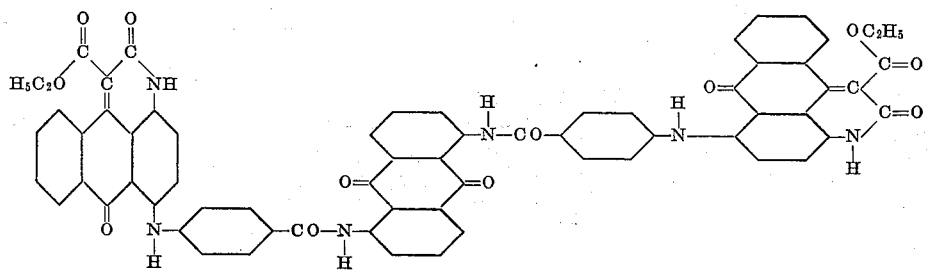

is filtered, washed and dried. It dyes cotton from a dark-red vat in blue-red shades.

A number of dyes obtained by the process herein described are summarised in the following table.

Table

| Acylating medium | Primary amine | Color of the vat | Coloration on cotton |
| --- | --- | --- | --- |
| N-methyl-4-o-carboxyphenylamino-1(N)9-anthrapyridone | 1-amino-6-chloroanthraquinone | Red-brown | Violet. |
| Do | 1:4-diaminoanthraquinone | Orange | Red-violet. |
| Do | 1-amino-4-(4'-methoxy-phenyl)-amino-anthraquinone | do | Violet. |
| Do | 1:5-diaminoanthraquinone | Yellow-red | Red. |
| Do | 1-amino-5-benzoylaminoanthraquinone | Dark yellow-red | Bordeaux-red. |
| Do | 4-amino-N-methylanthrapyridone | Insoluble | |
| 1(N)9-C-carbethoxy-2-methyl-4-o-carboxyphenylamino-anthrapyridone | 1:5-diaminoanthraquinone | Yellow-red | Red. |
| 1(N)9-methyl-4-m-carboxyphenylaminoanthrapyridone | 1:4-diaminoanthraquinone | Brown | Pink. |
| 1(N)9-C-carbethoxy-4-m-carboxyphenylaminoanthrapyridone | 2-amino-anthraquinone | Dark orange | Blue-red. |
| Do | 4-amino-N-methylanthrapyridone | do | Red-brown. |
| 1(N)9-C-carbethoxy-4-(3'-carboxy-4'-chlorophenyl)-aminoanthrapyridone | 1-aminoanthraquinone | Red-brown | Brown-violet. |
| 1-(N-methyl)-9-4-p-carboxyphenylaminoanthrapyridone | 1-amino-4-(4'-chloro-phenyl)-aminoanthraquinone | Dark red | Red-violet. |
| 1(N-methyl)9-4-p-carboxyphenyl-aminoanthrapyridone | 1:5-diamino-anthraquinone | do | Blue-red. |
| Do | 4-amino-N-methylanthrapyridone | Insoluble | |
| 1(N)9-C-carbethoxy-4-p-carboxyphenylaminoanthrapyridone | 1-aminoanthraquinone | Dark-red | Blue-red. |
| Do | 2-aminoanthraquinone | Dark orange | Bordeaux-red. |
| Do | 1:4-diaminoanthraquinone | Dark red | Ruby red. |
| Do | 1-amino-4-(4'-chloro-phenyl)-aminoanthraquinone | do | Red-violet. |
| Do | 1:5-diamino-anthraquinone | do | Blue-red. |
| Do | 2:6-diamino-ahthraquinone | Orange | Bordeaux-red. |
| Do | Diaminoanthrarufine | Dark red | Violet. |
| 1(N)9-C-carbethoxy-4-p-carboxyphenylaminoanthrapyridone | 4-amino-1-(N-methyl)9-C-carbethoxy-anthrapyridone | Red-brown | Blue-red. |
| 1(N)9-C-acetyl-4-p-carboxyphenyl-aminoanthrapyridone | 4-amino-N-methylanthrapyridone | Dark red-brown | Do. |
| 1(N)9-methyl-4-m-carboxy-phenyl-aminoanthrapyridone | 1-amino-4-benzoylamino-anthraquinone | Dark red | Do. |
| Do | 1-amino-5-benzoylamino-anthraquinone | do | Yellow-red. |
| 1(N)9-methyl-4-m-carboxy-phenyl-amino-anthrapyridone | 1-amino-4-methoxyanthra-quinone | Red-brown | Red. |
| 1(N)9-C-carbethoxy-4-p-carboxyphenyl-aminoanthrapyridone | 1-amino-4-methoxy-anthra-quinone | do | Blue-red. |
| Do | 1-amino-4-benzoyl-aminoanthra-quinone | Dark-red | Do. |
| Do | 5-aminoanthra-quinone-2:1-(N)-benzacridone | Red-violet | Dark red-violet. |
| N-methyl-4-(3'-carboxy)-phenyl-aminoanthra-pyridone | 4:4'-diamino-1:1'-dianthrimide | Brown | Corinth. |
| N-methyl-4-(4'-carboxy)-phenyl-aminoanthra-pyridone | 5-amino-1:2'-dianthrimide | Red-brown | Bordeaux-red. |
| C-carbethoxy-4-(4'-carboxy)-phenylamino-anthrapyridone | 5-amino-1:2'-dianthrimide | do | Do. |

EXAMPLE 6

7.9 parts of N-methyl-4-(4'-carboxy)-phenyl-amino-1(N)9-anthrapyridone and 200 parts of o-dichlorobenzene are heated to 100° C., whereupon 2.8 parts of thionyl chloride are slowly This application is a division of my application Ser. No. 427,076, filed January 16, 1942.

What I claim is:

1. A process for the manufacture of new acyl-amines of the anthraquinone series, comprising the step of condensing an anthrapyridone compound of the general formula

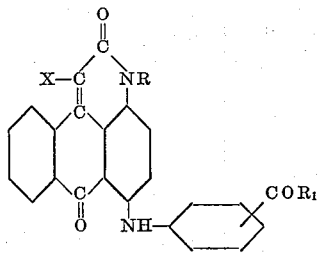

wherein R stands for a member of the group consisting of hydrogen and alkyl, $R_1$ stands for a member of the group consisting of hydroxy and halogen and X stands for a member of the group consisting of hydrogen, acyl, cyano and carbalkoxy, with a vattable anthraquinone compound containing at least one primary amino group.

2. A process for the manufacture of new acylamines of the anthraquinone series, comprising the step of condensing an anthrapyridone compound of the general formula

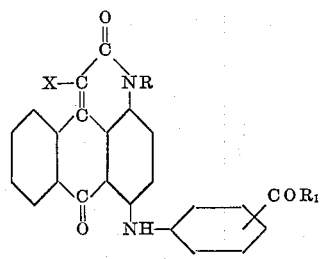

wherein R stands for a member of the group consisting of hydrogen and alkyl, $R_1$ stands for a member of the group consisting of hydroxy and halogen and X stands for a member of the group consisting of hydrogen, acyl, cyano and carbalkoxy, with a vattable anthraquinone compound containing at least one primary amino group in presence of an organic solvent.

3. A process for the manufacture of new acylamines of the anthraquinone series, comprising the step of condensing an anthrapyridone compound of the general formula

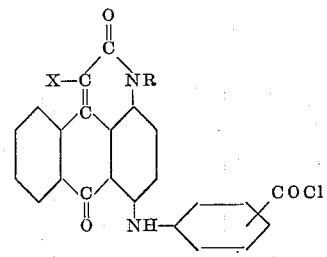

wherein R stands for a member of the group consisting of hydrogen and alkyl and X stands for a member of the group consisting of hydrogen, acyl, cyano and carbalkoxy, with a vattable anthraquinone compound containing at least one primary amino group in presence of an organic solvent.

4. A process for the manufacture of new acylamines of the anthraquinone series, comprising the step of condensing an anthrapyridone compound of the general formula

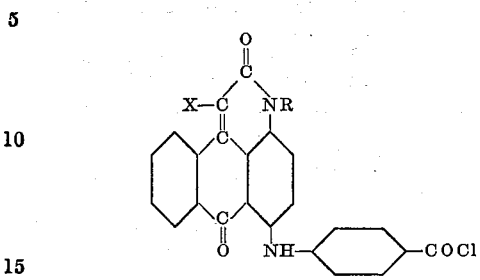

wherein R stands for a member of the group consisting of hydrogen and alkyl and X stands for a member of the group consisting of hydrogen, acyl, cyano and carbalkoxy, with a vattable anthraquinone compound containing at least one primary amino group in presence of an organic solvent.

5. A process for the manufacture of new acylamines of the anthraquinone series, comprising the step of condensing an anthrapyridone compound of the general formula

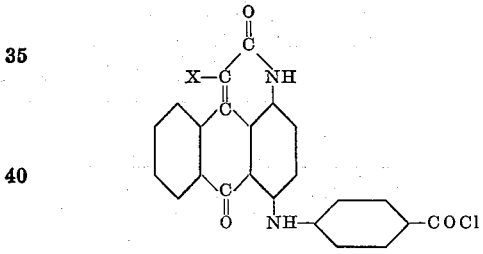

wherein X stands for a member of the group consisting of hydrogen, acyl, cyano and carbalkoxy, with a vattable anthraquinone compound containing at least one primary amino group in presence of an organic solvent.

6. A process for the manufacture of new acylamines of the anthraquinone series, comprising the step of condensing the anthrapyridone compound of the formula

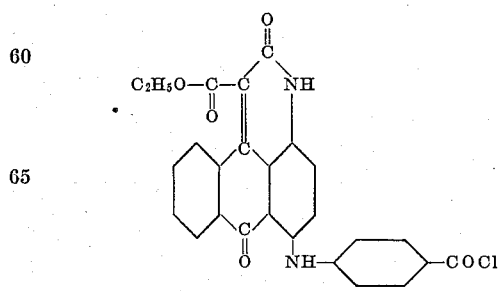

with a vattable anthraquinone compound containing at least one primary amino group in presence of an organic solvent.

7. A process for the manufacture of a new acylamine of the anthrapyridone series, comprising the step of condensing the anthrapyridone compound of the formula

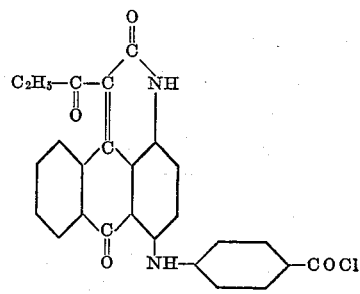

with 1-amino-4-benzoylaminoanthraquinone in presence of an organic solvent.

8. A process for the manufacture of a new acylamine of the anthrapyridone series, comprising the step of condensing the anthrapyridone compound of the formula

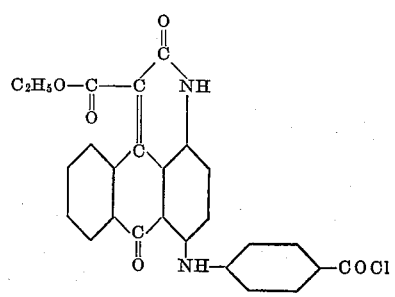

with 1:4-diaminoanthraquinone in presence of an organic solvent.

9. A process for the manufacture of a new acylamine of the anthrapyridone series, comprising the step of condensing the anthrapyridone compound of the formula

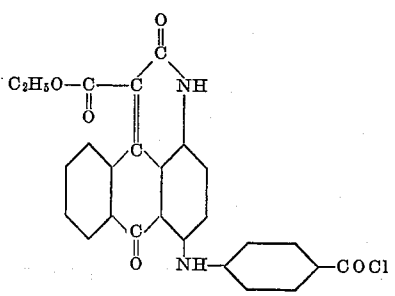

with 1:5-diaminoanthraquinone in presence of an organic solvent.

10. The new acylamines of the anthraquinone series possessing the general formula

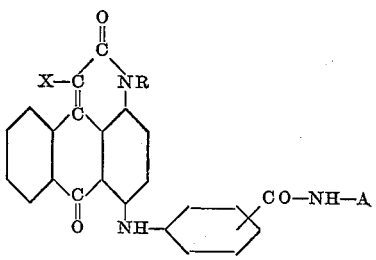

wherein X stands for a member of the group consisting of hydrogen, acyl, cyano and carbalkoxy, R stands for a member of the group consisting of hydrogen and alkyl and A stands for a vattable anthraquinone radical, which acylamines are vat dyestuffs possessing affinity for fibres of cellulosic nature and dyeing the same in red to violet shades.

11. The new acylamines of the anthraquinone series possessing the general formula

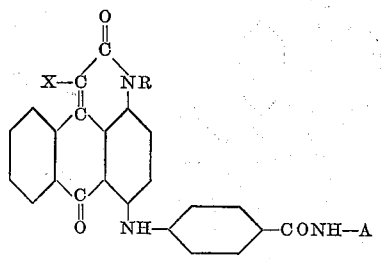

wherein X stands for a member of the group consisting of hydrogen, acyl, cyano and carbalkoxy, R stands for a member of the group consisting of hydrogen and alkyl and A stands for a vattable anthraquinone radical, which acylamines are vat dyestuffs possessing affinity for fibres of cellulosic nature and dyeing the same red to violet shades.

12. The new acylamines of the anthraquinone series possessing the general formula

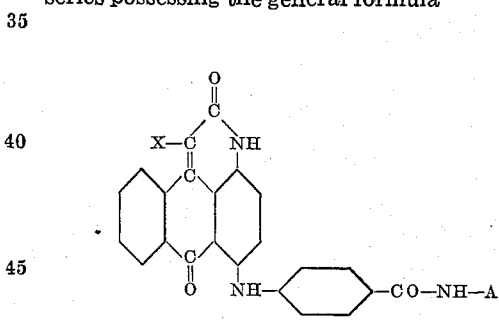

wherein X stands for a member of the group consisting of hydrogen, acyl, cyano and carbalkoxy and A stands for a vattable anthraquinone radical, which acylamines are vat dyestuffs possessing affinity for fibres of cellulosic nature and dyeing the same red to violet shades.

13. The new acylamines of the anthraquinone series possessing the general formula

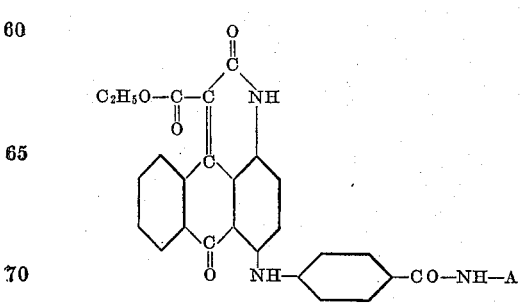

wherein A stands for a vattable anthraquinone radical, which compounds are vat dyestuffs possessing affinity for fibres of cellulosic nature and dyeing the same red to violet shades.

14. The new acylamine of the formula

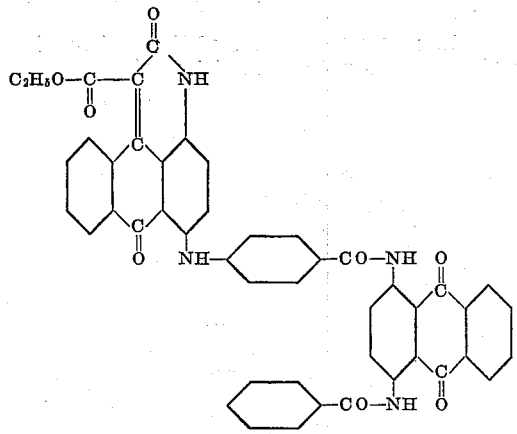

being a valuable vat dyestuff and dyeing cotton a blue-red shade.

15. The new anthrapyridone derivative of the formula

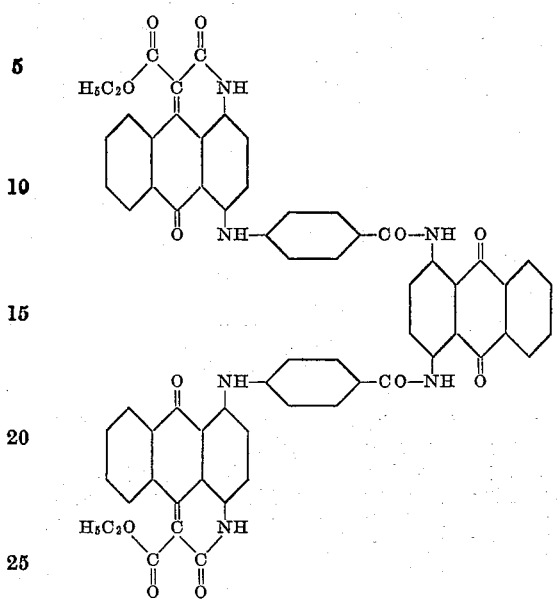

being a valuable vat dyestuff and dyeing cotton a blue-red shade.

16. The new anthrapyridone derivative of the formula

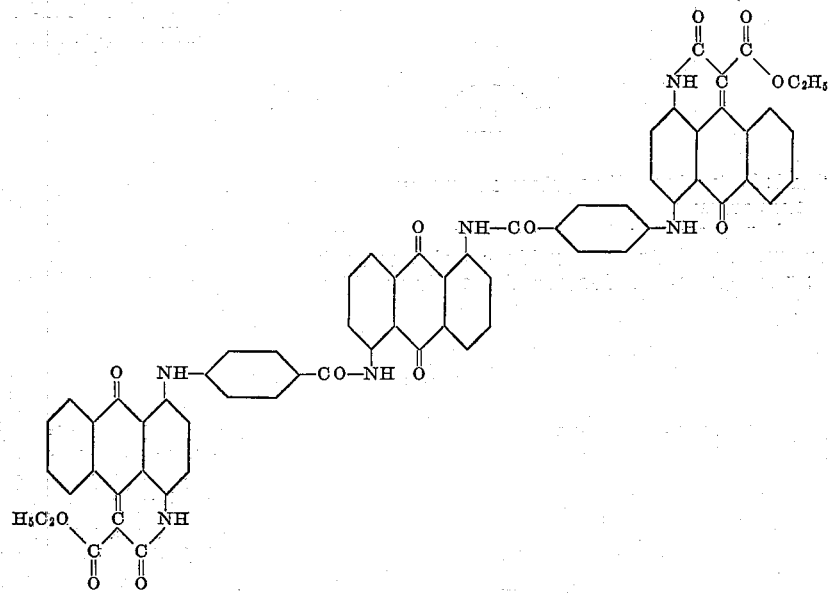

being a valuable vat dyestuff and dyeing cotton a bluish-red shade.

ALBIN PETER.